July 7, 1953 A. M. JOUBAN 2,644,861

TELEPHONE INSTRUMENT MASK

Filed Nov. 9, 1951 2 Sheets-Sheet 1

INVENTOR

ALBERT M. JOUBAN,

BY

McMorrow, Berman + Davidson

ATTORNEYS.

July 7, 1953 A. M. JOUBAN 2,644,861

TELEPHONE INSTRUMENT MASK

Filed Nov. 9, 1951 2 Sheets-Sheet 2

INVENTOR

ALBERT M. JOUBAN,

BY

McMorrow, Berman & Davidson

ATTORNEYS

Patented July 7, 1953

2,644,861

UNITED STATES PATENT OFFICE 2,644,861

TELEPHONE INSTRUMENT MASK

Albert M. Jouban, Lafayette, La.

Application November 9, 1951, Serial No. 255,624

4 Claims. (Cl. 179—179)

This invention relates to masks or covers for telephone instruments, and more particularly to a mask arranged to facilitate the dialing of a telephone instrument and to a self-illuminated mask which renders it easy to dial a telephone instrument in the dark.

It is among the objects of the invention to provide a mask or cover for a telephone instrument which carries a dialing pin by means of which the dialing of the instrument is greatly facilitated; which carries dialing indicia of a larger size and in a more conveniently visible location than the indicia on the telephone instrument dial and which is conveniently located with reference to the movable dialing pin so that the dialing pin can be accurately positioned and the chance of mis-dialing substantially eliminated; which has transparent indicia illuminated from within the mask to render the indicia clearly visible when outside light is poor or absent; which can be easily mounted on a telephone instrument with no modification of the instrument construction; and which is simple and durable in construction, economical to manufacture, and neat and attractive in appearance.

Other objects and advantages will become apparent from a consideration of the following description and appended claims in conjunction with the accompanying drawings, wherein:

Figure 1:
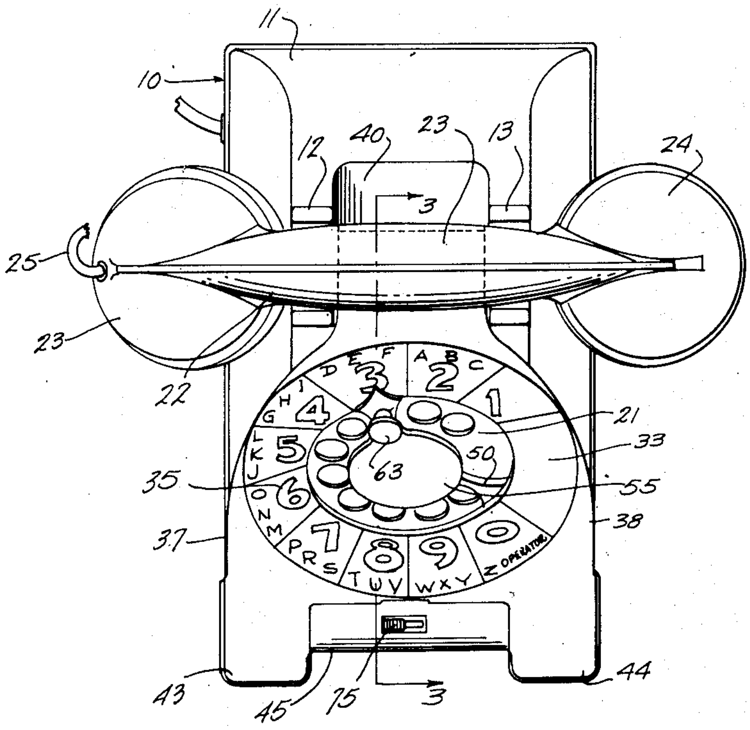
Figure 1 is a top plan view of a conventional telephone instrument with a mask illustrative of the invention operatively mounted thereon.

With continued reference to the drawings, the telephone instrument, generally indicated at 10, is of a form well known to the art and has a base portion 11 of substantially rectangular shape with receiver rests 12 and 13 on its upper side, one at each side thereof and intermediate the length of the base, but nearer the rear end than the front end thereof. A handle recess 14 is provided between the rests 12 and 13 opening rearwardly of the rests and provided at its upper side with a ledge 15 having a feathered distal edge and providing a finger grip for lifting the instrument. The instrument has a flat front surface 16 inclined downwardly and forwardly from the handle formation and curved outwardly at its lower end, as indicated at 17, to the upper edge of the front end surface 18 of the instrument. A thin flange or ledge 19 depends from the body of the instrument along the front end and between the front corners thereof, and a dial or number plate 20 is mounted on the inclined front face of the instrument extending forwardly and downwardly from a location adjacent the proximal edge of the handle ledge 15. The dial or number plate 20 is provided with the usual dialing indicia including numbers angularly spaced apart thereabout and a group of letters adjacent each number and a dialing or finger plate 21 is rotatably mounted on the instrument and positioned above and substantially parallel to the dial plate 20. A combined transmitter and receiver unit 22 includes a handle 23 adapted to be disposed, when not in use, transversely of the instrument and to rest in the rests 12 and 13, a transmitter unit 23 at one end and a receiver unit 24 at the other end of the handle. The transmitter and receiver unit is connected to the instrument by an elongated, flexible, conductor cord 25 in a manner well known to the art.

As telephone instruments of the character indicated are old and well known to the art, a more detailed illustration and description of the instrument is considered unnecessary for the purposes of the present disclosure.

The mask or cover of the present invention comprises a thin-walled body, generally indicated at 30, of a resilient material, such as a synthetic resin plastic, which may be transparent, translucent or opaque, as may be desired, but which, if transparent, is preferably colored. This body has a circular opening 31 therein of substantially the same size as the dial plate 20 of the telephone instrument 10, and has an outer side and an inner side. A generally cylindrical flange 32 surrounds the opening 31 in the body and extends substantially perpendicularly from the inner side of the body, the distal end of this flange being adapted to rest on the front face of a telephone instrument surrounding the telephone dial plate 20, as is particularly illustrated in Figure 3. A beveled annular portion 33 surrounds the opening 31 at the proximal end of the flange 32 and is inclined inwardly of the body from its outer edge to its inner edge. This annular portion 33 is provided with dialing indicia, as indicated at 35 in Figures 1 and 2, in the form of numbers angularly spaced apart around the opening 31, and a group of letters associated with each number, these indicia being formed of transparent material which is preferably either clear or a different color from the color of the body 30, if the body is formed of transparent material.

Figures 3, 4, 5:
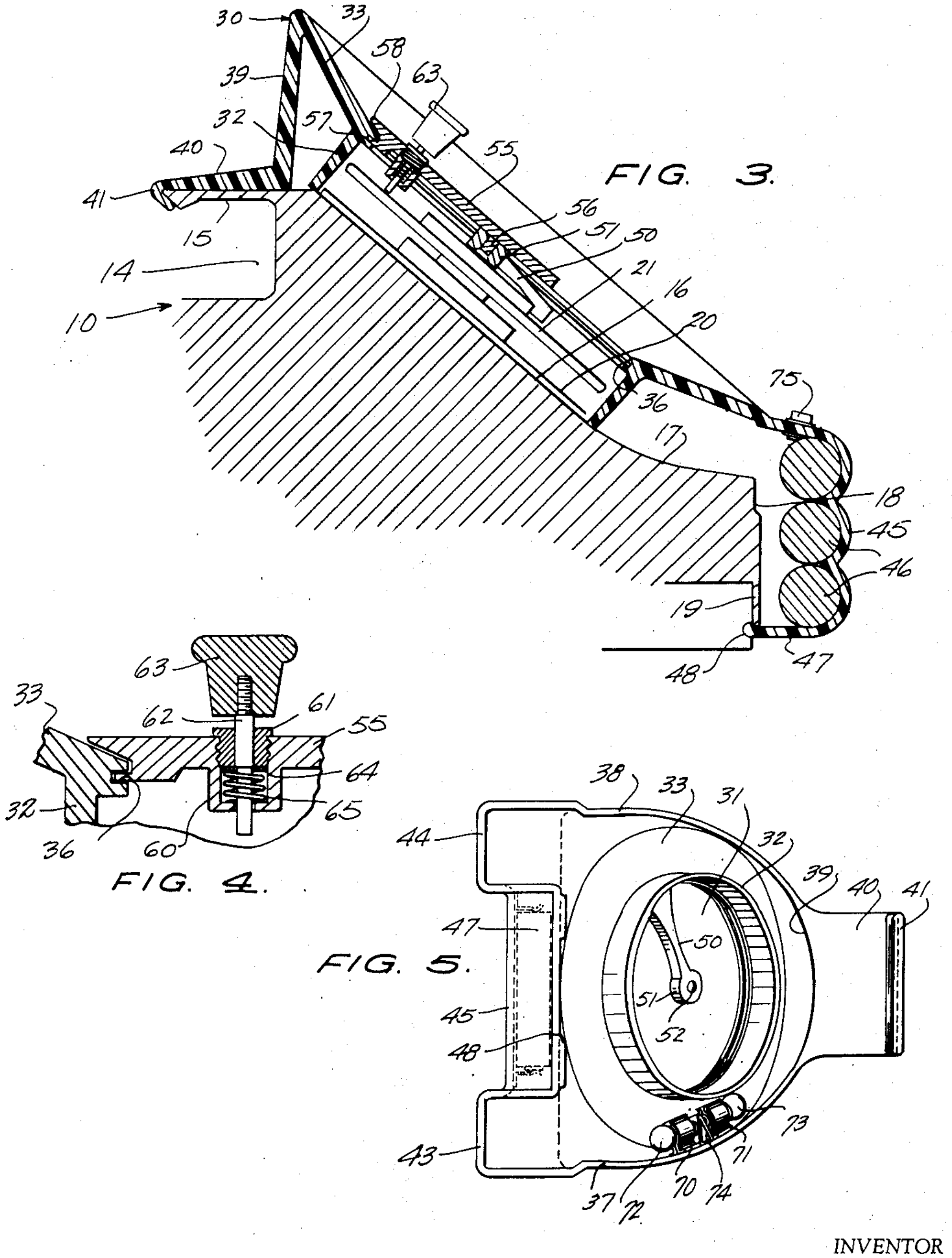
Figure 3 is a cross-sectional view on an enlarged scale on the line 3—3 of Figure 1.
Figure 4 is a fragmentary cross-sectional view on substantially the same section plane as that of Figure 3 showing structural details of the device.
Figure 5 is a bottom plan view of the mask.

This annular portion 33 extends slightly inwardly of the proximal end of the flange 32 and is provided with an annular groove 36, as is clearly illustrated in Figures 3 and 4.

A side wall of substantially semicircular shape extends around a portion of the outer edge of the annular portion 33, this side wall including side portions 37 and 38 and a rear portion 39. A tongue 40 extends outwardly from the distal edge of the rear portion 39 of the side wall of the mask and is of a width to pass conveniently between the receiver rests 12 and 13 of a conventional telephone instrument. At its distal end this tongue 40 is provided with a hook formation 41 which engages over the feathered distal edge of the hand grip ledge 15 of the instrument, as is clearly shown in Figure 3.

Figure 2:
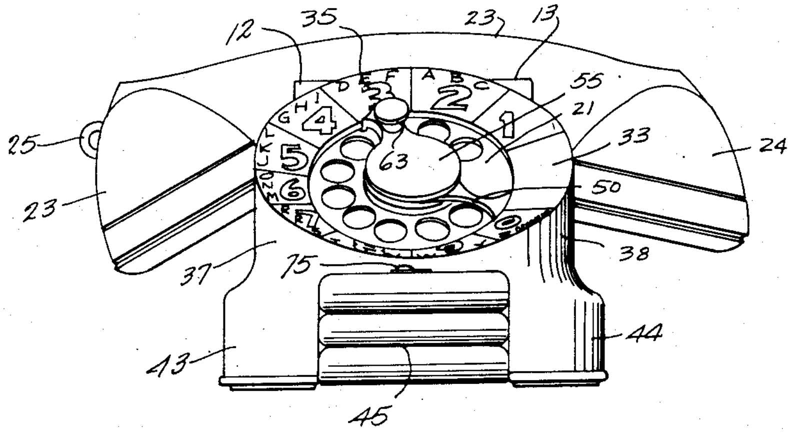
Figure 2 is a front end elevational view of the telephone instrument and mask illustrated in Figure 1.

A pair of hollow legs 43 and 44 project outwardly one from each end of the side wall of the body, and are adapted to fit over the front corners of the instrument base 11, as clearly illustrated in Figures 1 and 2. A battery case formation 45 extends between the legs 43 and 44 and is adapted to receive a plurality of flashlight cells or batteries 46. The lower edge portion 47 of the battery case 45 extends inwardly and is provided along its inner edge with a modified hook formation 48 which engages under the bottom edge of the front flange 19 of the instrument to assist in holding the mask firmly in place on the telephone instrument.

A bridge 50 extends diametrically or radially across the opening 31 from the inner edge of the annular portion 33 of the body 30 and is provided at the center of the opening with an eye formation 51 having an aperture 52 extending therethrough.

A lever 55 is provided intermediate its length, but adjacent one end with a pin 56 received in the aperture 52 of the bridge 50, and this lever is provided at its other end with a tongue 57 slidably received in the groove 36 and with an extension 58 spaced outwardly from the tongue 57 and slidably engaging the outer surface of the annular portion 33 at the inner edge of this annular portion.

Between the pin 56 and the tongue 57 the lever 55 is provided with an inwardly projecting socket 60 having a centrally located aperture in its end wall. The socket 60 is open at its end at the upper or outer side of the lever 55, and an apertured nut 61 is threaded into this end of the socket. A dialing pin 62 extends through the aperture in the end wall of the socket 60 and through the nut 61, and a knob 63 is secured on this pin at the end thereof adjacent the outer side of the lever 55. An abutment washer 64 is secured on the pin 62 between the inner end of the nut 61 and the end wall of the socket 60, and a compression spring 65 surrounds the pin between the abutment washer 64 and the end wall of the socket to resiliently urge the pin in a direction toward the knob 63.

The pin 62 can be manually depressed by finger pressure on the knob 63 to bring the end of the pin remote from the knob 63 into engagement in the holes provided in the dialing plate 21 of the telephone instrument, and the lever 55 can then be swung around its pivotal connection with the bridge 50 to turn the dial plate.

In dialing a telephone instrument provided with the mask of the present invention, the knob 63 is grasped and without depressing the pin 62, the lever 55 is swung to the proper position around the opening 31, as indicated by the dialing indicia 35 on the annular portion 33 of the mask. When the lever has been properly positioned, the knob is depressed, moving the pin 62 into engagement with the dial plate 21, and the lever is then swung in the proper dialing direction to the stop position. The depressing pressure on the knob 63 is then released and the lever swung back to the next dialing position, as indicated by the indicia on the annular portion of the mask, whereupon the knob is again depressed and the lever swung back to the stop position, this process being repeated until the entire number has been dialed. As the indicia on the annular portion of the mask are of large size and are clearly visible with no obscuring plate overlying them, it is easy to properly position the movable end of the lever 55 in the proper dialing position, and there would be no reason for mis-dialing the instrument with the consequent calling of a wrong number.

A pair of lamp bulb sockets 70 and 71, in the form of flat spring clips, are mounted on the inner side of the side wall of the mask, and bulbs 72 and 73 are mounted in the sockets 70 and 71, respectively, and positioned between the side wall of the body 30 and the flange 32 where the light will be directed through the transparent indicia 35 in the annular portion 33 of the body when the bulbs are illuminated. Suitable means, not illustrated in detail, are provided to make a complete electrical circuit between the bulbs 72 and 73, and the batteries 46, such means including a contact element 74 disposed between the adjacent ends of the bulbs and engaging the center contacts thereof, and a manually operated switch 75 mounted in the top portion of the battery case formation 45.

The mask can be easily mounted on a telephone instrument by first removing the combined transmitter and receiver from the rests 12 and 13, positioning the tongue 20 of the mask between the rests and engaging the hook formation 41 of the tongue over the distal edge of the ledge 15 of the instrument and then pushing the front portion of the mask down until the formation 48 on the distal edge of the lower end portion 47 of the battery case engages under the bottom edge of the front flange 19 of the instrument with the legs 43 and 44 overlying and enclosing the front corners of the instrument base portion. The material of the mask has sufficient resiliency to permit the mask to snap onto the instrument and no modification whatever of the instrument is required for the installation of the mask thereon.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A telephone instrument mask comprising a thin-walled body of resilient material of partly circular shape having an outer side and an inner side and having therein a circular opening of substantially the same size as a conventional telephone instrument dial and a flange of substantially cylindrical shape extending from the inner side of said body in surrounding relationship to said opening and adapted to rest at its distal edge on the top surface of a telephone instrument surrounding the dial thereof, said body also having a beveled annular portion surrounding said opening and provided with indicia corresponding to telephone dial indicia, a tongue extending from said annular portion and provided at its distal end with a hook formation adapted to engage the handle formation of an associated telephone instrument, legs extending from said annular portion opposite said tongue and adapted to engage over the front corners of an associated telephone instrument, a battery case formation between said legs and a bridge extending across said opening, a lever pivotally connected adjacent one end to said bridge at the center of said opening and having its other end in sliding engagement with the edge of said body around said opening, a socket formation carried by said lever adjacent the other end thereof, a dialing pin extending slidably through said socket formation and having a knob on its end at the other side of said lever, resilient means in said socket urging said pin in a direction toward said knob, said pin being manually depressible against the force of said resilient means into engagement with the dial of an associated telephone instrument.

2. A telephone instrument mask comprising a thin-walled body of resilient material of partly circular shape having an outer side and an inner side and having therein a circular opening of substantially the same size as a conventional telephone instrument dial and a flange of substantially cylindrical shape extending from the inner side of said body in surrounding relationship to said opening and adapted to rest at its distal edge on the top surface of a telephone instrument surrounding the dial thereof, said body also having a beveled annular portion surround-said opening and provided with indicia corresponding to telephone dial indicia, a tongue extending from said annular portion and provided at its distal end with a hook formation adapted to engage the handle formation of an associated telephone instrument, legs extending from said annular portion opposite said tongue and adapted to engage over the front corners of an associated telephone instrument, a battery case formation between said legs and a bridge extending across said opening, a lever pivotally connected adjacent one end to said bridge at the center of said opening and having its other end in sliding engagement with the edge of said body around said opening, a socket formation carried by said lever adjacent the other end thereof, a dialing pin extending slidably through said socket formation and having a knob on its end at the other side of said lever, resilient means in said socket urging said pin in a direction toward said knob, said pin being manually depressible against the force of said resilient means into engagement with the dial of an associated telephone instrument, and a light unit mounted in said body adjacent said flange and adapted to be connected to batteries disposed in said battery case.

3. A telephone instrument mask comprising a thin-walled body of resilient material of partly circular shape having an outer side and an inner side and having therein a circular opening of substantially the same size as a conventional telephone instrument dial and a flange of substantially cylindrical shape extending from the inner side of said body in surrounding relationship to said opening and adapted to rest at its distal edge on the top surface of a telephone instrument surrounding the dial thereof, said body also having a beveled annular portion surrounding said opening and provided with indicia corresponding to telephone dial indicia, a tongue extending from said annular portion and provided at its distal end with a hook formation adapted to engage the handle formation of an associated telephone instrument, legs extending from said annular portion opposite said tongue and adapted to engage over the front corners of an associated telephone instrument, a battery case formation between said legs and a bridge extending across said opening, a level pivotally connected adjacent one end to said bridge at the center of said opening and having its other end in sliding engagement with the edge of said body around said opening, a socket formation carried by said lever adjacent the other end thereof, a dialing pin extending slidably through said socket formation and having a knob on its end at the other side of said lever, resilient means in said socket urging said pin in a direction toward said knob, said pin beng manually depressible against the force of said resilient means into engagement with the dial of an associated telephone instrument, and a light unit mounted in said body adjacent said flange and adapted to be connected to batteries disposed in said battery case, said body having side walls spaced from said flange and transparent indicia in said annular portion, and said light unit being disposed at the inner side of said body between a side wall and said flange for transmitting light through said transparent indicia.

4. In combination with a telephone instrument having a base portion of substantially rectangular shape, a handle formation extending upwardly from said base portion and including a rearwardly directed handle ledge extending transversely of said base portion and providing a finger grip for lifting the instrument, receiver rests disposed one at each end of said ledge, a front surface inclined forwardly and downwardly from the proximal edge of said ledge to the front end of said base portion, a number plate mounted on said front surface, a finger plate pivotally mounted on said instrument and disposed above said number plate, and a depending flange at the front end of said base portion, a mask including a thin-walled body of resilient material including an inwardly inclined annular portion spaced from the front surface of said instrument in surrounding relationship to said number plate and finger plate and having dialing indicia thereon, an annular flange extending from the inner edge of said annular portion to the front surface of said instrument in surrounding relationship to said number plate, a side wall structure extending from the outer edge of said annular portion to the front face of said instrument, a tongue extending from said side wall structure between said receiver rests and having at its distal end a hook formation engaging the distal edge of said handle ledge of the instrument, hollow leg formations extending from said side wall structure and receiving the front corners of said instrument base portion, a formation on said body between said legs engaging under said depending flange to lock the mask on the telephone instrument, a bridge extending inwardly of the inner edge of said annular portion, a lever pivotally mounted on said bridge at the center of said annular portion and having one edge in sliding engagement with the inner edge of said annular portion, and a dialing pin carried by said lever and manually movable into engagement with said finger plate.

ALBERT M. JOUBAN.

References Cited in the file of this patent

UNITED STATES PATENTS

| Number | Name | Date |
|---|---|---|
| 1,900,916 | Currivan | Mar. 14, 1933 |
| 2,231,103 | Baker | Feb. 11, 1941 |
| 2,516,676 | Caroselli | July 25, 1950 |
| 2,572,089 | La Porte | Oct. 23, 1951 |